US009425968B2

(12) United States Patent
Demeter et al.

(10) Patent No.: US 9,425,968 B2
(45) Date of Patent: Aug. 23, 2016

(54) SYSTEM AND METHOD FOR UPDATING AN ENCRYPTION KEY ACROSS A NETWORK

(71) Applicant: LANDIS+GYR INNOVATIONS, INC., Alpharetta, GA (US)

(72) Inventors: Michael Demeter, Johns Creek, GA (US); Stephen Chasko, Marietta, GA (US)

(73) Assignee: Landis+Gyr Innovations, Inc., Alpharetta, GA (US)

(*) Notice: Subject to any disclaimer, the term of this patent is extended or adjusted under 35 U.S.C. 154(b) by 203 days.

(21) Appl. No.: 14/289,246

(22) Filed: May 28, 2014

(65) Prior Publication Data

US 2015/0143108 A1  May 21, 2015

Related U.S. Application Data

(60) Provisional application No. 61/904,829, filed on Nov. 15, 2013.

(51) Int. Cl.
*H04L 9/32* (2006.01)
*H04L 29/06* (2006.01)
*H04L 9/08* (2006.01)

(52) U.S. Cl.
CPC ............ *H04L 9/3268* (2013.01); *H04L 9/0891* (2013.01); *H04L 63/0435* (2013.01); *H04L 63/06* (2013.01); *H04L 63/062* (2013.01); H04L 63/0823 (2013.01); *H04L 63/0892* (2013.01); *H04L 2463/061* (2013.01)

(58) Field of Classification Search
CPC ...... H04L 9/3268; H04L 9/0891; H04L 63/06
See application file for complete search history.

(56) References Cited

U.S. PATENT DOCUMENTS

2006/0062393 A1* 3/2006 Hsu ................ H04L 9/0861
  380/281
2009/0016524 A1* 1/2009 Park ................ H04W 8/26
  380/44

(Continued)

FOREIGN PATENT DOCUMENTS

WO  2012077999  6/2012
WO  2015073422  5/2015

OTHER PUBLICATIONS

Lily Chen, "Recommendation for key derivation using Pseudorandom functions", 2009, pp. 1-21.*

(Continued)

*Primary Examiner* — Jayesh Jhaveri
*Assistant Examiner* — Wasika Nipa
(74) *Attorney, Agent, or Firm* — Kilpatrick Townsend & Stockton LLP

(57) ABSTRACT

Systems and methods are provided for generating subsequent encryption keys by a client device as one of a plurality of client devices across a network. Each client device is provided with the same key generation information and the same key setup information from an authentication server. Each client device maintains and stores its own key generation information and key setup information. Using its own information, each client device generates subsequent encryption keys that are common or the same across devices. These subsequent encryption keys are generated and maintained the same across devices without any further instruction or information from the authentication server or any other client device. Additionally, client devices can recover the current encryption key by synchronizing information with another client device.

15 Claims, 6 Drawing Sheets

(56) References Cited

U.S. PATENT DOCUMENTS

2012/0078548 A1 3/2012 Salazar et al.
2013/0315389 A1* 11/2013 Jung ................. H04L 63/065
　　　　　　　　　　　　　　　　　　　　380/31

OTHER PUBLICATIONS

PCT/US2014/064989, "International Search Report and Written Opinion", Jul. 15, 2015, 21 pages.
"Broadcast and Multicast Service in cdma2000 Wireless IP Network", Revision A,3rd Generation Partnership Project 2, 3GPP2, Version 0.3, Mar. 31, 2006, 140 pages.
Chen, "Recommendation for Key Derivation Using Pseudorandom Functions (Revised)", NIST Special Publication 800-108 http://csrc.nist.gov/publications/nistpubs/800-108/sp800-108.pdf, Oct. 1, 2009, 21 pages.
Nabeel, et al., "Cryptographic Key Management for Smart Power Grids—Approaches and Issues", URL:http://arxiv.org/abs/1206.3880 Submitted on Jun. 18, 2012, Feb. 22, 2012, 25 pages.
PCT/US2014/064989, "Invitation to Pay Add'l Fees and Partial Search Report", Apr. 15, 2015, 5 pages.
Forsberg et al., "Protocol for Carrying Authentication for Network Access (PANA)", Network Working Group, Request for Comments: 5191; Standards Track, May 2008, 46 pages.

* cited by examiner

SYSTEM AND METHOD FOR UPDATING AN ENCRYPTION KEY ACROSS A NETWORK

RELATED APPLICATION

This application claims priority to U.S. Ser. No. 61/904,829 filed Nov. 15, 2013 entitled System and Method for Updating an Encryption Key Across a Network, which is incorporated herein by reference.

TECHNICAL FIELD

This disclosure relates generally to updating an encryption key across devices in a network and more particularly directed to using a device-generated key as an updated encryption key.

BACKGROUND

Encryption keys may be used to securely communicate between devices in a network. To increase security, an encryption key should be periodically changed in a manner that is not readily apparent from the current encryption key. In some networks, an authentication server provides the devices with an initial encryption key and then periodically updates the key by sending an updated encryption key to each device. In other networks, the authentication server provides the devices with an initial encryption key and then periodically sends a command to the devices in the network instructing the devices to update the encryption key in a predetermined manner. In either of these situations, the update of the encryption key requires communication from the authentication server across the network to all of the devices. In large networks this requires significant bandwidth and negatively affects the performance of the network.

SUMMARY

Systems and methods are disclosed for generating an encryption key and updating it by a client device. Although the encryption keys are generated and updated independently by each client device at periodic intervals, they remain common across the client devices on the network.

In an exemplary method each client device is provided with key generation information comprising a derivation method and a derivation index adjustment. A secure channel is established between an authentication server and a client device. The authentication server transmits via the secure channel key setup information comprising a derivation key, a derivation index, an initial expiration period, and an expiration interval. Although, the client device maintains and stores its own key generation information and key setup information, this information remains common across devices in the network to allow generation of subsequent encryption keys that are used for secure communication across devices in a network without any additional communication between the client devices and the authentication server.

In response to the client device receiving key setup information, the client device generates an initial encryption key based at least in part on the derivation method provided and the key setup information previously received from the authentication server comprising the derivation key and the derivation index. The initial encryption key is common to the plurality of client devices across the network and valid until the expiration of the initial expiration period previously received from the authentication server.

In response to the client device determining that the initial expiration period has expired, the client device generates a current derivation index based on the derivation index previously received from the authentication server and the derivation index adjustment. Also, the client device generates a current expiration period based on the initial expiration period and the expiration interval received from the authentication server. A subsequent encryption key is now generated by the client device based at least in part on the derivation method provided, the derivation key previously received from the authentication server and the current derivation index. Each subsequent encryption key is generated in a similar manner so that it is common to the of client devices across the network and valid until the current expiration period expires.

In response to the client device determining that the current expiration period has expired, the client device resets the current expiration period to a value based on the current expiration period and the expiration interval previously received from the authentication server. Additionally, the current derivation index is updated based on the current derivation index and the derivation index adjustment. The next subsequent encryption key is generated using the updated current derivation index and is valid until the expiration of the current expiration period.

A method is also disclosed for recovering the current encryption key by a client device without any communication to or from the authentication server. An exemplary method includes a client device synchronizing its current derivation index and its current expiration period with the valid current derivation index and the valid current expiration period that are currently used by devices on the network to generate a valid current encryption key. Another exemplary method includes a client device generating a valid current derivation index, a current expiration period, and a valid current encryption key by receiving a message that includes the current time.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
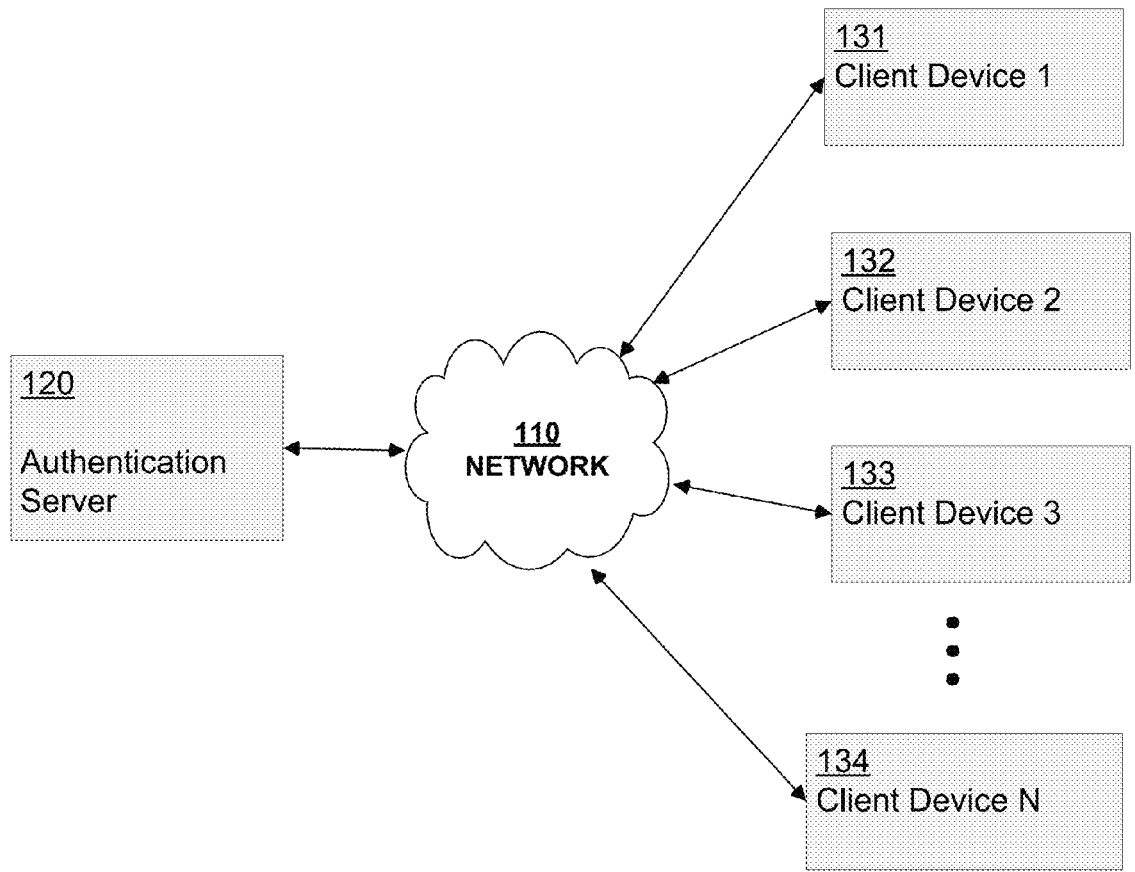
FIG. 1 is diagram illustrating the configuration of an authentication server and client devices via a network.

Systems and methods are provided for generating an initial encryption key and subsequent encryption keys at devices within a network that can be used by all devices in the network. The configuration of these devices on a network includes an authentication server that communicates with multiple client devices via a network. The devices of the network (i.e., the authentication server and the client devices) may be connected in any known manner, including both wired and wireless connection and may use any type of communication protocol such as the IP protocol.

The multiple client devices communicate with each other and with the authentication server through the network. The devices in the network use the same encryption key; therefore an encryption key common across devices is used for security of communication between devices. The encryption key may also be used for secure communication between any client device and the authentication server.

Encryption Key Generation

Each of the client devices within the network comprises a processor and memory. Each client device is provided with key generation information comprising but not limited to a derivation algorithm or method and a derivation index adjustment. In one implementation, the derivation method is based on NIST SP 800-108. In another implementation, the derivation method may use a pseudo random function which may be the SHA-256 based HMAC as described in FIPS 198-1. However, other pseudo random functions may be used as long as they provide sufficient randomization to make it difficult to determine an encryption key. For example, the derivation method may use a label such as a string to introduce randomization when generating an encryption key. The key generation information may be provided during initialization of the client device or during manufacture. The key generation information is stored by each device in its own memory.

An authentication server on the network sends each client device via a secure channel, key setup information comprising a derivation key, a derivation index, an initial expiration period, and an expiration interval. Like the key generation information provided, the key setup information received by each client device is also stored by each device in its own memory.

In response to a client device receiving key setup information, the client device generates, independently, an initial encryption key. The initial encryption key is generated by each client device based at least in part on the derivation method that was provided to the client device and the key setup information, including but not limited to the derivation key and the derivation index that was previously received from the authentication server.

Since each client device was provided the same derivation method and the same key setup information, the initial encryption key generated by each device is common to or the same for all client devices. The initial encryption key is valid until the expiration of the initial expiration period that was provided to each client device. Note that the encryption key most recently generated is the one used by the device to verify messages and also to encrypt and decrypt messages, hence the initial encryption key may become the current encryption key. The terminology of "initial encryption key" is used in this application for ease of reference in explaining the generation of encryption keys that are generated at different times.

The authentication server comprises a processor and memory and also generates an initial encryption key that when generated is the same as the initial encryption key that is independently generated by each client device. To do this, the authentication server is provided the same key generation information that is provided to each client device. The authentication server stores the key generation information in its own memory. In addition, the authentication server maintains in its memory the same key setup information. Therefore, the authentication server can generate an initial encryption key based at least in part on the derivation method provided and the key setup information. The initial encryption key generated by the authentication server is the same as that generated by each client device and is valid until the expiration of the initial expiration period.

Each device on the network including the multiple client devices and the authentication server independently generates an initial encryption key. Though each device independently generates its own initial encryption key, the initial encryption key for all devices is the same. Note that the initial expiration period received by all client devices and maintained by the authentication server is also the same; therefore, all devices on the network are synchronized to securely communicate using the initial encryption key until the end of the initial expiration period.

In response to a device, either a client device or the authentication server, determining that the initial expiration period has expired, the device generates a new encryption key. Since all devices determine the expiration using the same initial expiration period, all devices concurrently determine that the initial expiration period has expired. Once the initial expiration period has expired, several steps are taken by the devices to generate a subsequent encryption key. A current derivation index is generated by each device using the derivation index previously received from the authentication server and the derivation index adjustment provided. A current expiration period for the subsequent encryption key is generated based on the initial expiration period and the expiration interval previously received from the authentication server.

Once a current derivation index is generated, a subsequent encryption key is generated based at least in part on the derivation method provided, the derivation key previously received from the authentication server and the current derivation index. Like the initial encryption key, even though the subsequent encryption key is generated by each device independently, the subsequent encryption key is the same across devices in the network. The subsequent encryption key most recently generated may become the current encryption key.

Similar to the initial encryption key, the current encryption key is valid until the end of the current expiration period. Note that the current expiration period generated by all devices is generated using the initial expiration period and the expiration interval provided by the authentication server. This information is stored and maintained independently by each device, but since it was provided by the authentication server to the client devices on the network, the information is the same across devices. Therefore, all devices on the network are synchronized to securely communicate using the current encryption key until the end of the current expiration period.

In response to a device determining that the current expiration period has expired, the device generates another new encryption key using the same method as described above. This includes updating the current derivation index by the derivation index adjustment, updating the current expiration period by the expiration interval and generating the next subsequent encryption key based on the derivation method, the derivation key, and the updated derivation index. The next subsequent encryption key becomes the current encryption key and will be valid until the updated current expiration period. And, again, upon a device determining that the updated current expiration period has expired, the device generates a next subsequent encryption key that becomes the current encryption key as described above.

This iteration of generating subsequent encryption keys that become the current encryption key and is valid for the current expiration period may continue indefinitely and is performed independently by each device since each device stores and maintains the key generation information, the key setup information and any other information that is generated by each device such as the current derivation index and the current expiration period.

In some embodiments, the encryption key, whether the initial encryption key or a subsequent encryption key is generated based on a derivation method. All devices may use the same derivation method to generate a common encryption key. As is known in the art, additional information may be provided to the derivation method such as number of iterations to perform or length of the key to generate. The derivation method used should provide sufficient randomization to make it difficult to determine a subsequent encryption key, even if the current encryption key becomes known. If additional information is to be provided to the derivation method, the additional information that each device would provide to the derivation method to generate an encryption key should be such that it ensure that the same encryption key is generated by the multiple devices on the network.

In other embodiments, if the length of the output of the derivation method exceeds the desired length of the encryption key, then the client device may use only a portion of the output of the derivation method. For example, if the desired length is 128 bits and the output form the derivation method is 256 bits, then the first 128 bits may be used as the encryption key. The desired length is predetermined and may be provided to the devices along with the derivation method and the derivation index adjustment.

Encryption Key Recovery

If one of the client devices is unable to verify messages from another client device using the current encryption key, the devices can attempt to synchronize the current derivation index to generate a valid current encryption key. By synchronizing its current derivation index, a client device can insure that its current encryption key matches the current encryption key of the other client devices without requiring any exchange with the authentication server.

For example, if Device A sends a message to Device B and Device B is unable to verify the message from Device A, the following steps may be performed to synchronize the current derivation index of Device A and Device B. For this example, the current derivation index is incremented by the value of the derivation index adjustment; therefore, with each iteration that generates a subsequent encryption key, the current derivation index increments by a predetermined amount. This predetermined amount is the derivation index adjustment. The steps are as follows:

Device B receives message from Device A.

Device B cannot verify message from Device A using Device B's current encryption key.

Device B will attempt to verify the message using a trial encryption key that is generated using its current derivation index incremented by the derivation index adjustment. Therefore, Device B generates a trial encryption key using its own derivation index incremented by the derivation index adjustment. If verification of the message from Device A succeeds using the trial encryption key, Device B adopts the trial encryption key as its own current encryption key and adopts the incremented derivation index as its current derivation index. If the message Device B received from Device A contains information to update B's current derivation index, Device B stops processing the message received from Device A.

If verification of the message from A does not succeed using the trial encryption key generated by incrementing B's current derivation index, then Device B generates a different trial encryption key using its current derivation index decremented by the derivation index adjustment. Therefore, B generates a trial encryption key using its own derivation index decremented by the derivation index adjustment. Successful verification of the message from Device A using this trial encryption key may signify that Device A is using the previous value of the derivation index as its current derivation index. Device B would send to Device A a message that is encrypted with Device B's current encryption key. When Device A receives this message from Device B, Device A will not be able to verify this message and Device A will commence its own encryption key recovery.

If verification of the message from A does not succeed using the trial encryption key generated by decrementing B's current derivation index, then Device B generates a different trial encryption key using a previous derivation key and its current derivation index. If Device B does not have a previous derivation key, Device B disregards the message from Device A. If verification of the message from Device A succeeds using the trial encryption key generated using a previous derivation key, then Device A is using a previous derivation key. Device B sends a message to Device A to update its derivation key encrypted using the trial encryption key so Device A can verify this message.

If verification of the message from A does not succeed using the trial encryption key generated using a previous derivation key and its current derivation index, Device B disregards the message from Device A.

Encryption key recovery may also be performed if a client device has experienced a loss of power. Once a device has experienced a loss of power, its internal clock may no longer have the current device time. In one embodiment, a client device that has experienced an outage and comes online may recover the encryption when it receives a message that contains the current time. Such a message may be a beacon message which contains an authentication code that may be verified using the current encryption key.

When a device that comes online receives a beacon message, it will attempt to verify the authentication code of the beacon message using its current encryption key. If verification succeeds, the device can accept the time designated in the beacon message as its current device time. Hence the device has the current derivation key, current derivation index, current expiration period and current encryption key.

If verification of the beacon message fails, the device calculates the number of expiration intervals that have expired since it lost power. This may be calculated using the time in the beacon message, the current expiration period and the expiration interval. If the beacon message does not contain the time, the device may use one as the number of expiration intervals that have expired since it lost power.

The current derivation index is incremented by the number of intervals that have expired since the device lost power. A subsequent encryption key is generated using the current derivation key and the current derivation index that was incremented by the number of intervals that have expired since power outage. If verification of the beacon message succeeds using the subsequent encryption key generated, the device accepts the time in the beacon. Additionally, the device generates a current expiration period based on the current expiration period and the expiration interval. The device also updates its current values for the current derivation index and current encryption key to those just generated.

If verification of the beacon message fails with the subsequent encryption key just generated, the beacon message is disregarded. In this example, since the device received a beacon message it knows that there is a neighboring device. If after a predetermined time (i.e., 30 sec.) it is not able to obtain a valid time, it may generate a time that is random over the next 24 hours. At that generated time it initiates authentication with the authentication server. The time to initiate authentication with the authentication server is random so that all devices do not attempt authentication at the same time.

In the previous examples given, the client devices may be meters in a network that may be used by utility companies and other resource providers to monitor, control, and measure the consumption of resources by consumers. The present invention will now be described with reference to the accompanying drawings, in which exemplary embodiments of the invention are shown.

FIG. 1 is an example of a configuration of an authentication server and client devices via a network. The authentication server 120 communicates with various client devices 131-134 via network 110. Any client device 131-134 may communicate with any other client device 131-134 or the authentication server 120 via the network 110. Communication may proceed utilizing any appropriate protocol and any appropriate network configuration. Protocols include, but are not limited to the 802.15.4, PRIME, G3, and TCP/IP and UDP/IP protocols.

Devices on the network include but are not limited to an authentication server 120 and client devices 131-134. For secure communication among devices 120, 131-134 in network 110, the devices utilize an encryption key to encrypt messages that are sent and decrypt messages that are received. To provide further security, the encryption key is updated periodically by each device. However, the updated encryption key is the same across devices 120, 131-134 to allow for encryption and decryption of messages across all devices 120, 131-134 in network 110.

Figure 2:
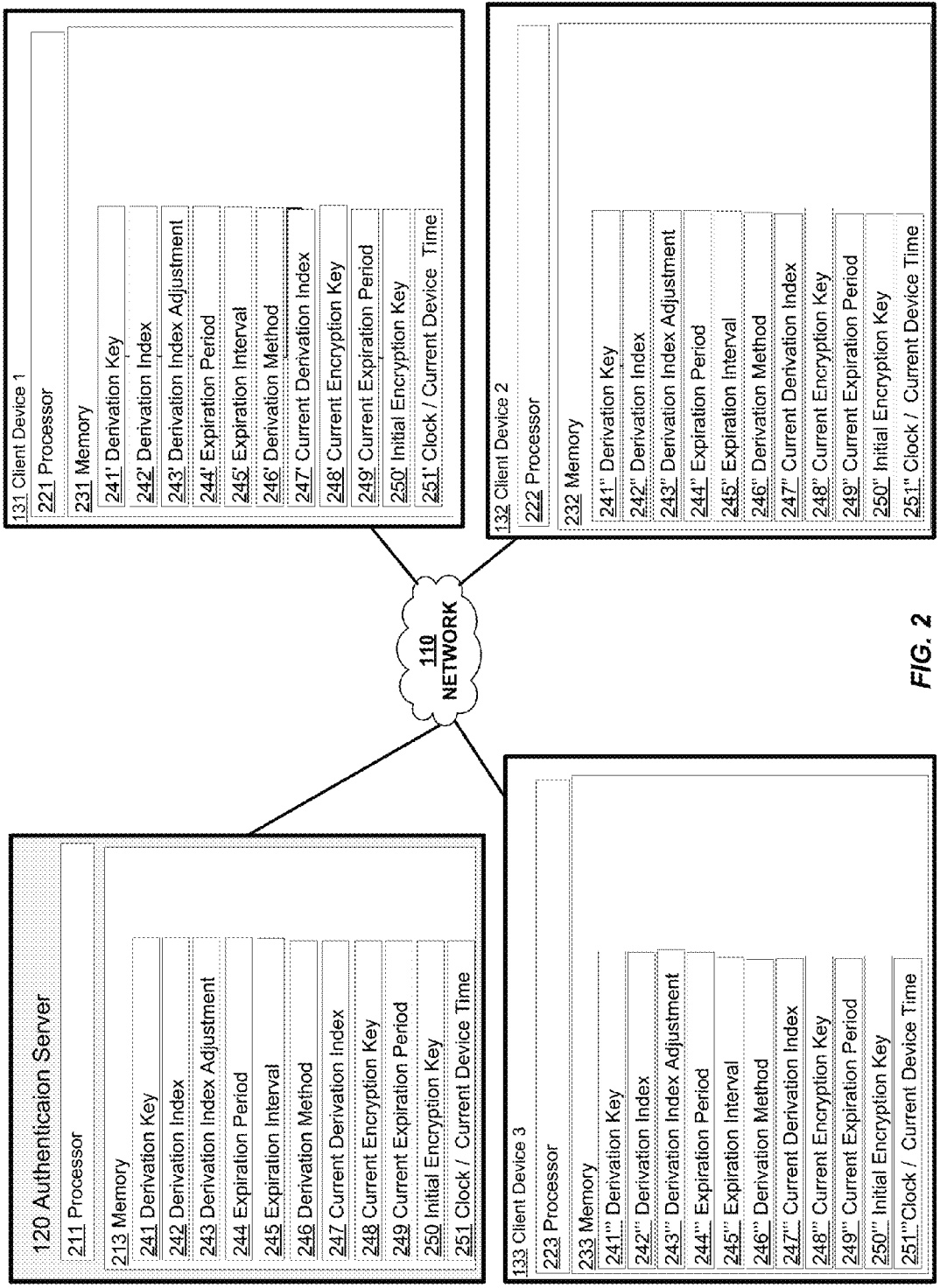
FIG. 2 is a diagram illustrating information utilized by the authentication server and the client devices in generating and maintaining encryption keys.

Referring to FIG. 2, the authentication server 120 comprises a processor 211 and memory 213. The processor 211 of authentication server 120 executes instructions stored in memory 213. The authentication server 120 maintains in its memory information for generating encryption keys. The information comprises key generation information including but not limited to a derivation method 246 and a derivation index adjustment 243. The key generation information may be provided to the authentication server upon installation or manufacture.

Additionally, the authentication server maintains in its memory additional information for generating encryption keys. This additional information comprises key setup information including but not limited to a derivation key 241, a derivation index 242, an expiration period 244 and an expiration interval 245. Like the key generation information, the key setup information may be provided to the authentication server upon installation or manufacture. The authentication server also comprises a clock 251 which keeps the current device time for the authentication server. The clock which keeps the current device time for the authentication server may be set during initialization or installation of the authentication server. Additionally, it may be set or reset upon receipt of a message which contains the current time.

There may be multiple client devices 131-133 on the network. Each client device 131-133 comprises a processor 221, 222, 223 and memory 231, 232, 233, respectively. Each processor 221-223 executes instructions stored in the respective memory 231-233 of the client device 131-133. In this example, it is assumed that client device 131, client device 132 and client device 133 are similar. Hence, descriptions regarding one client device are applicable to all client devices 131-133.

Each client device 131-133 is provided key generation information including but not limited to a derivation method 246', 246", and 246''' a derivation index adjustment 243', 243', and 243". Note that the derivation method 246 provided to the authentication server 120, the derivation method 246' provided to client device 131, the derivation method 246" provided to client device 132, and the derivation method 246''' provided to client device 133 are the same. Likewise, the derivation index adjustment 243 that is provided to the authentication server 120 and the derivation index adjustment 243', 243", and 243''' that is provided by each of the client devices 131-133 is the same. Each device 120, 131, 132, 133 independently stores and maintains the key generation information that is common across the devices 120, 131, 132, 133 on network 110. Additionally, each client device comprises a clock 251', 251", and 251''' which maintains the current device time for each client device. The current device time for each device may be initially set during installation or initialization of the client device. Also, it may be set upon receiving a message which includes the current time. This message may be received from the authentication server or another client device. An example of a type of message that contains the current time is a beacon message.

For further reference the common reference numerals with hash marks in FIG. 2 denote common information that is stored and maintained independently for each device. For example, referring to FIG. 2, the derivation key 241 in the authentication server, the derivation key 241' of client device 131, the derivation key 241" of client device 132, and the derivation key 241''' of client device 133 are all the same. However, each device maintains its own copy of this information in its respective memory 231-233.

To generate an encryption key that is common to the devices in network 110, any client device 131-133 on the network requests the establishment of a secure channel between the client device 131-133 and the authentication server 120. For example, client device 131 can request that a secure channel be established between itself and the authentication server 120. The authentication server 120 then transmits a message to the client device 131. This message includes key setup information, including but not limited to the derivation key 241, the derivation index 242, the expiration period 244, and the expiration interval 245. Client device 131 stores and maintains this information independently in its memory 231 as derivation key 241', derivation index 242', expiration period 244' and expiration interval 245'. Note that the key setup information transmitted to any device 131-133 from the authentication server 120 is the same. In other words, the key setup information stored and maintained by each device is common to all devices. Like the key generation information, each device 120, 131, 132, 133 independently stores and maintains the key setup information that is common across the devices 120, 131, 132, 133 on network 110.

Once client device 131 determines that it has received the key setup information, client device 131 generates an initial encryption key 248' based at least in part on the derivation method 246' provided and the previously received key setup information comprising the derivation key 241' and the derivation index 242'. This process of generating an initial encryption key 250' is common to all client devices 131-133 and therefore, once each of the client devices 131-133 independently determines that it has received key setup information from the authentication server 120, it will generate its own initial encryption key 250', 250", and 250''' that is common to all devices 131-133. In other words, the initial encryption key 250' that is independently generated by client device 131 will be the same as the initial encryption key 250" that is generated by client device 132 and the same as the initial encryption key 250'" that is generated by client device 133. Each client devices 131-133 stores its own initial encryption key 250', 250", and 250'" in its own memory 231-233, respectively.

Note that the initial encryption key 250', 250", and 250'" becomes the current encryption key. That is, the initial encryption key is the encryption key that is used currently by all devices until the expiration period 244', 244", and 244"'. Each device may store the initial encryption key 250', 250", and 250'" separate from the current encryption key 248', 248", and 248"'. Alternatively, a device may store and maintain the initial encryption key as the current encryption key. In this embodiment, not shown, the memory of the device would not include an initial encryption key as the initial encryption key would be stored and maintained as the current encryption key.

The authentication server 120 may also generate its own initial encryption key 250 the same way that the client devices generate their initial encryption key. Since the information required to generate the initial encryption key is the same across devices, the initial encryption key 250 generated by the authentication server has the same value as the initial encryption key 250', 250", 250'" generated independently by each client devices 131-133. Likewise, the authentication server 120 may store and maintain the initial encryption key as a current encryption key.

The initial encryption key 250 is valid until the expiration of the expiration period 244 that was received from the authentication server 120 and stored separately by each client device 121-133 as 244', 244", 244'" in its own memory 231-233, respectively. Therefore, any client device 131-133 can determine if the expiration period 244 has expired. When client device 131 determines that the expiration period 244' has expired, it will generate a current derivation index 247' by modifying the derivation index 242' previously received from the authentication server 120 by the derivation index adjustment 243' that was previously provided. Other client devices 132, 133 can also determine when the expiration period 244 has expired using their own expiration period 244", 244'", and they too will generate a current derivation index 247" and 247'" that will be the same across devices 131-133.

The authentication server 120 can also determine when its initial encryption key 250 expires by determining if its expiration period 244 has expired. Hence the initial encryption key 250, 250', 250", and 250'" of all devices expire concurrently since the expiration periods 244, 244', 244", and 244'" are the same.

In addition to generating a current derivation index 247', client device 131 will also generate a current expiration period 249' based on the expiration period 244' and the expiration interval 245' previously received from the authentication server 120. Likewise, the authentication server 120 and other devices 132-133 will also generate their current expiration period 249, 249", and 249'" in the same manner and therefore the current expiration period generated across all devices is the same.

Along with generating a current derivation index 247' and a current expiration period 249', upon determining that the expiration period 244' has expired, client device 131 generates a subsequent encryption key based at least in part on the derivation method 246' provided, the derivation key 241' previously received from the authentication server 120 and the current derivation index 247'. This subsequent encryption key recently generated becomes the current encryption key 248' and is valid until the current expiration period 249'. This same procedure is followed by all the other devices on the network to generate their respective current encryption key 248, 248", 248'" which will be valid until the current expiration period 249, 249", and 249'".

The devices on the network 110 including the authentication server 120 and the client devices 131-133 are synchronized to generate encryption keys by having information common to all devices. This common information includes but is not limited to the derivation key 241, the derivation index 242, the derivation index adjustment 243, the expiration period 244, the expiration interval 245, the derivation method 246, the current derivation index 247, the current expiration period 249. Although this information is maintained independently by each device, it is common among devices. This synchronization through the use of common information allows each device to independently generate a current encryption key that is common among devices in the network.

The current encryption key 248 is valid until the current expiration period 249. When a device determines that the current expiration period 249 has expired, subsequent encryption keys are generated. Each subsequent encryption key is valid for a respective expiration period. For example, when device 131 determines that the current encryption key 248' is no longer valid because the current expiration period has been reached, client device 131 will generate a next subsequent encryption key and a respective expiration period for the next subsequent encryption key generated. The next subsequent encryption key becomes the current encryption key 248' and the respective expiration period becomes the current expiration period 249'.

To generate a next subsequent encryption key, device 131 generates a new derivation index by modifying the current derivation index 247' that it maintains in its memory 231 by the derivation index adjustment 243'. For example, if the value of the derivation index adjustment 243' is one, then the value of the new derivation index would be the value of the current derivation index 247' incremented by one. The current derivation index 247' can be updated to the value of the new derivation index. Therefore, client device 131 has an updated current derivation index 247' to be used in generating the next subsequent encryption key.

Additionally, device 131 generates a respective expiration period for the next subsequent encryption key. The respective expiration period is generated based on the current expiration period 249' that device 131 maintains in its memory 231 and the expiration interval 245' previously received from the authentication server and maintained in device's 131 memory 231. The respective expiration period is the expiration period for the next subsequent encryption key that will be generated as explained below. Therefore, the current expiration period 249' is updated to the value of the respective expiration period. Now client device 131 has an updated current derivation index 247' and a current expiration period 249'.

Client device 131 generates the next subsequent encryption key based at least in part on the derivation method 246' provided, the derivation key 241' received from the authentication server, and the current derivation index 247' calculated by the client device. The value of the current encryption key 248' is replaced by the value of the next subsequent encryption key. In other words, the current encryption key 248' is updated to be the next subsequent encryption key. Now, client device 131 has an updated current encryption key 248' that is valid until the current expiration period 249' expires.

Once the current expiration period expires, the cycle of updating the current derivation index 247', updating the current expiration period 249', and generating a next subsequent encryption key that becomes the current encryption key 248' is repeated. Every device on the network follows this procedure of generating its own current encryption key 248, 248', 248", and 248"' every time the current expiration period 249, 249', 249" and 249"' expires. This allows devices on the network to independently generate a current encryption key 248, 248', 248", and 248"' that is common among the devices and can be used for secure communication among the devices.

FIG. 2 shows each device having a derivation index 242, 242', 242", and 242"' and a current derivation index 247, 247', 247", and 247"'. Note that a device may store and maintain only one derivation index which would be the derivation index currently used to generate the current encryption key. Hence each time the derivation index is updated it would be stored as the current derivation index thereby replacing the previous current derivation index. Likewise, each device may or may not maintain both an expiration period 244, 244', 244", and 244"' and a current expiration period 249, 249', 249", and 249"'. In this embodiment, the initial expiration period previously received from the authentication server may be stored and maintained as the current expiration period. Also, each time an expiration period is generated; it would be stored and maintained as the current expiration period replacing a previous current expiration period. Each device may also only store and maintain a current encryption key 248, 248', 248", and 248"'. Similarly, each device may or may not maintain an initial encryption key 250, 250', 250", and 250"' and a current encryption key 248, 248', 248", and 248"'. In this embodiment, the initial encryption key may be stored and maintained as the current encryption key. As a subsequent encryption key is generated, it would replace the current encryption key.

Figure 3:
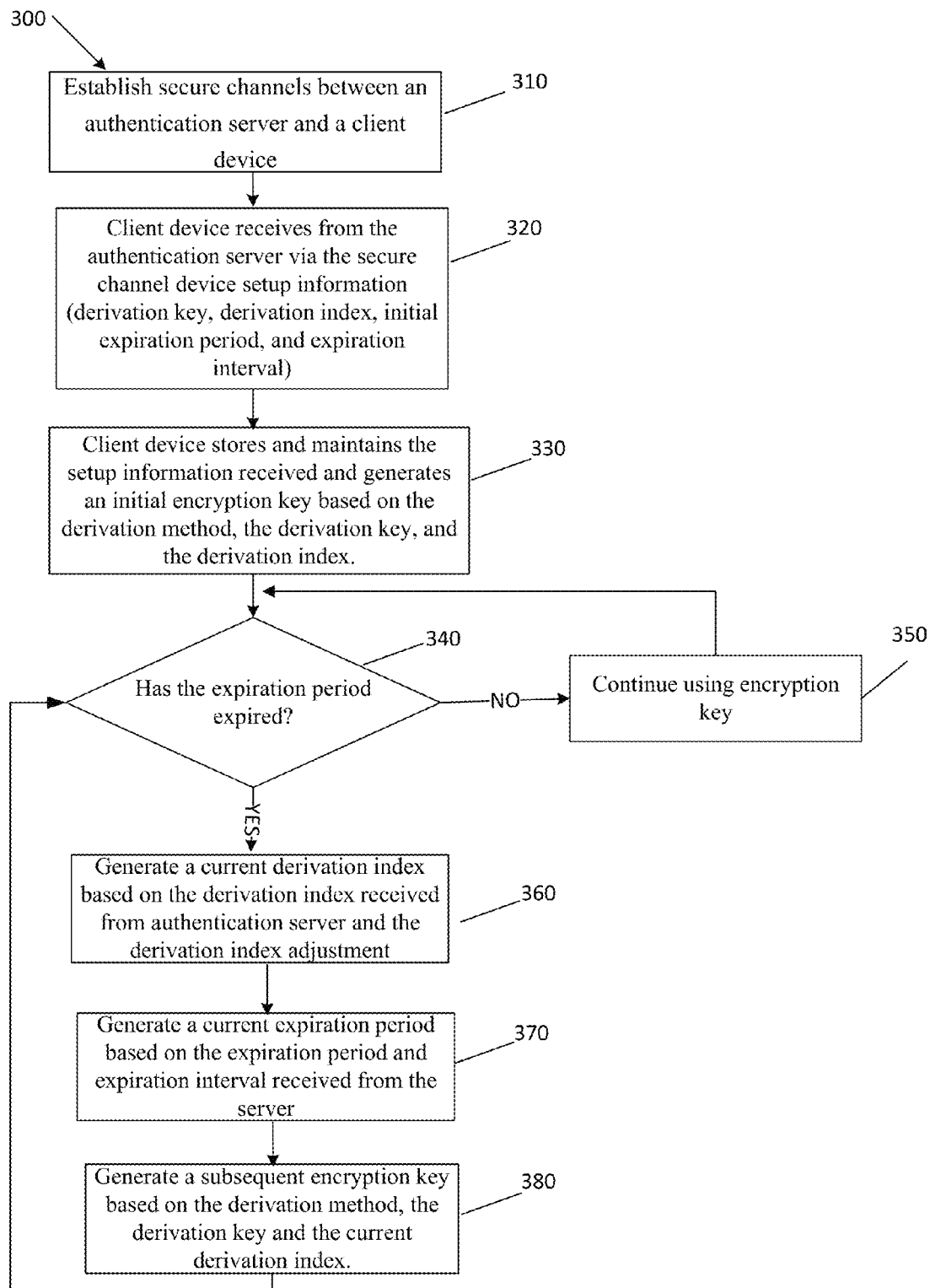
FIG. 3 is a flowchart illustrating the generation of an initial encryption key and subsequent encryption keys.

FIG. 3 illustrates a process 300 for generating an initial encryption key and subsequent encryption keys that are common to devices on a network. A secure channel between an authentication server and a client device is established at step 310. The request to establish the channel can be initiated by the server or the client device.

After the secure channel is established, the authentication server transmits via the secure channel setup information including but not limited to a derivation key, a derivation index, an expiration period, and an expiration interval to the client device at step 320.

In response to the client device receiving key setup information, at step 330, the client device generates an initial encryption key based on the derivation method provided and the derivation key and the derivation index received from the authentication server at step 320. The initial encryption key is valid and can be used for secure communication across devices on the network until the expiration of the expiration period.

At step 340, the client device determines if the expiration period has expired. If the expiration period has not expired, the initial encryption key is valid and the client device continues to use the initial encryption key at step 350.

If the expiration period has expired, the client device generates a current derivation index by modifying the derivation index previously received from the authentication server by the derivation index adjustment at step 360. Additionally, the client device generates at step 370 a current expiration period based at least in part on the expiration period and the expiration interval previously received from the authentication server at step 320. The steps of generating a current derivation index at step 360 and the step of generating a current expiration period at step 370 may be performed in different order. In one embodiment, the expiration period may be generated before or after generating the current derivation index.

At step 380 a subsequent encryption key is generated since the initial encryption key is no longer valid. The subsequent encryption key is generated based at least in part on the derivation method provided, the derivation key previously received form the authentication server at step 320 and the current derivation index. Each subsequent encryption key is common to the devices across the network and valid until the expiration of the current expiration period. The subsequent encryption key most recently generated is the current encryption key. This most recent subsequent encryption key which becomes the current encryption key is valid until the current expiration period expires.

When the client device determines that the current expiration period has expired, steps 360-380 are repeated to periodically generate subsequent encryption keys. Since all information needed by the client device to generate subsequent encryption keys is stored and maintained by the client device, the client device independently generates subsequent encryption keys that are valid to use for secure communication with other devices on the network.

Figure 4A:
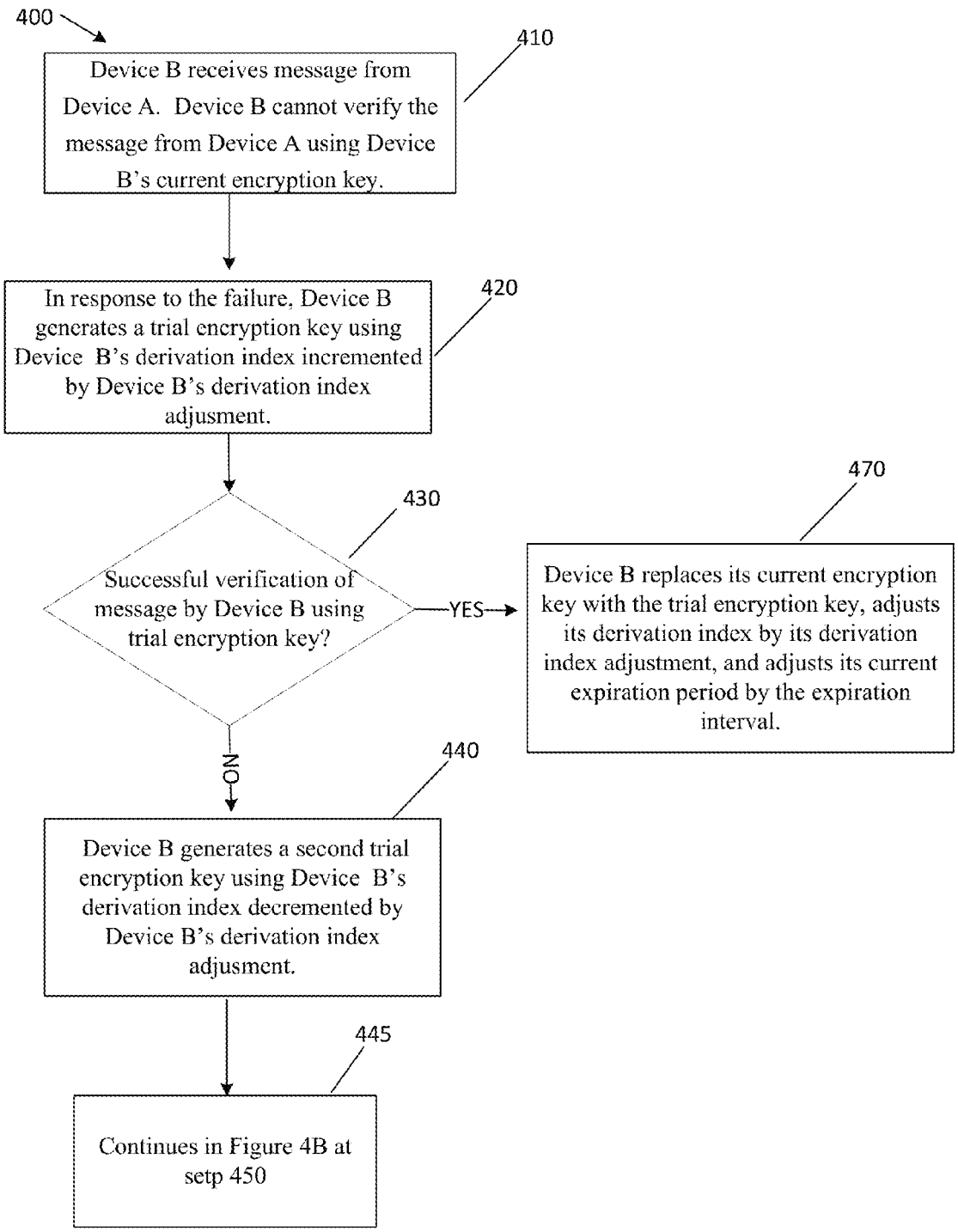
FIG. 4A is a flowchart illustrating a client device recovering the encryption key.
Figure 4B:
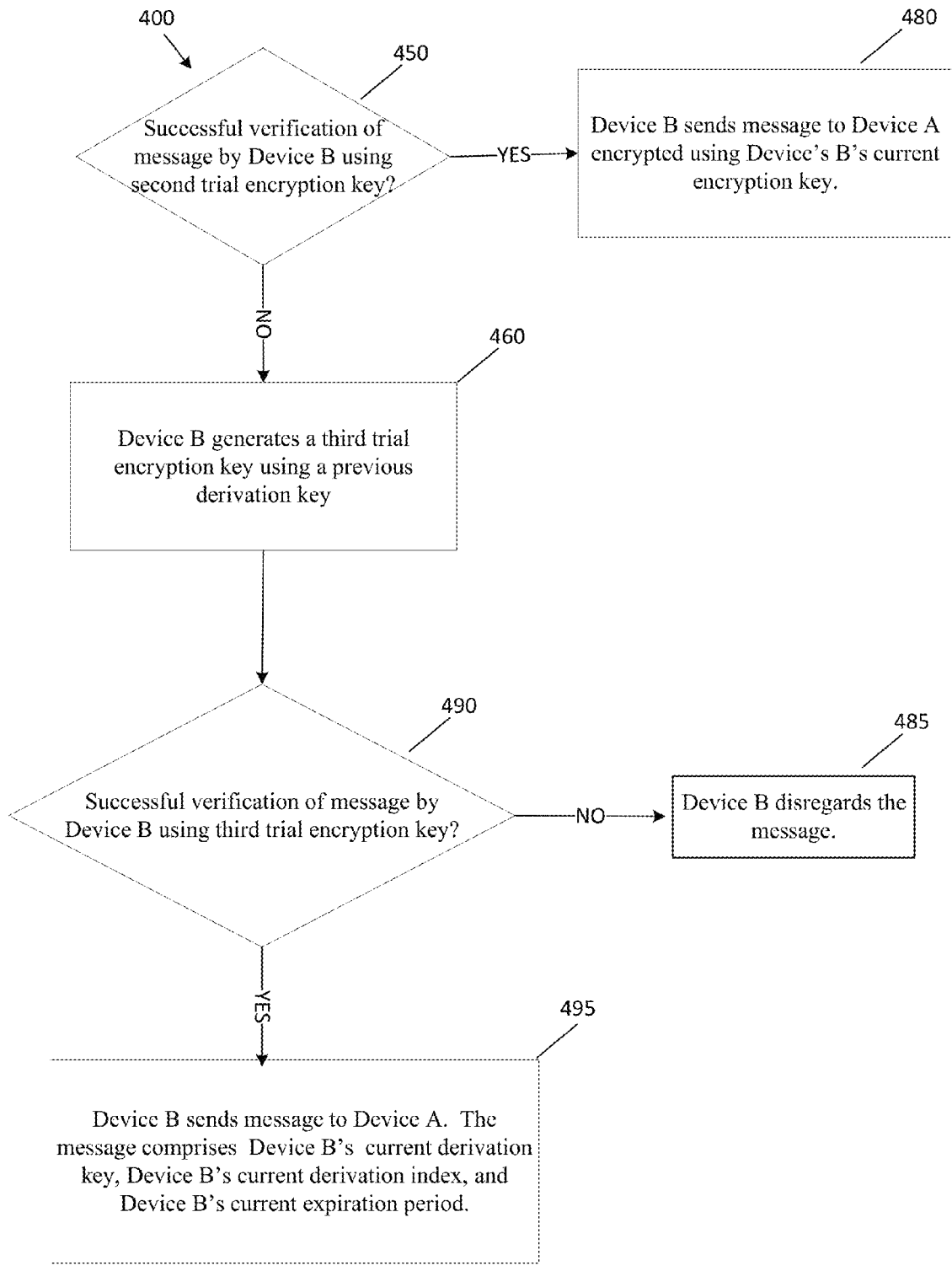
FIG. 4B is a continuation of the flowchart of FIG. 4A illustrating a client device recovering the encryption key.

FIG. 4A-4B illustrate a process 400 for recovering the encryption key currently being used among the devices in a network. This process is directed to recovery of the current encryption key by a client device without the need for any communication to or from the authentication server by generating trial encryption keys. Through the use of trial encryption keys, a device may synchronize its current derivation index and its current expiration period with the valid current derivation index and the valid current expiration period that are currently used by devices on the network to generate a valid current encryption key.

For example, at step 410, Device B receives a message from Device A. Device B is unable to verify the message received from Device A using the current encryption key of Device B.

In this example, in response to Device B's inability to verify the message received using its current encryption key, Device B generates a trial encryption key at step 420. The trial encryption key is generated using a trial derivation index. The trial derivation index is generated by incrementing the derivation index by the derivation index adjustment. Hence this trial encryption key is the subsequent encryption key that Device B would generate once the current expiration period expired.

Successful verification of the message by Device B using the trial encryption key at step 430 signifies that Device B replaces its current encryption key with the trial encryption key, replaces its current derivation index with the trial derivation index, and adjusts its current expiration period based on the expiration interval as shown at step 470. If verification of the message using the trial encryption key is unsuccessful at step 430, Device B would generate a second trial encryption key at step 440. The second trial encryption key is generated using a trial derivation index. This trial derivation index is generated by decrementing the derivation index by the derivation index adjustment. Hence this trial encryption key is the previous encryption key that Device B generated. In other words, this trial encryption key was the encryption key used by Device B before the current encryption key was used. Note, after step 440 in FIG. 4A, the process 400 continues at step 450 in FIG. 4B.

Referring to FIG. 4B, successful verification of the message by Device B using the second trial encryption key at step 450 signifies that Device A may be using the previous encryption key. Hence, Device B sends to Device A a message encrypted with Device B's current encryption key at step 480. When Device A receives this message from Device B, it may commence its own encryption key recovery process. If verification of the message using the second trial encryption key is unsuccessful at step 460, Device B would generate a third trial encryption key using a previous derivation key. A previous derivation key may be the derivation key used by Device B before the derivation key currently used. If Device B does not store previous derivation keys the message from Device A may be disregarded or dropped.

Successful verification of the message by Device B using the third trial encryption key at step 490 signifies that Device A may be using a previous derivation key. Hence, Device B sends to Device A a message comprising the values of Device B's current derivation key, Device B's current derivation index, and Device B's current expiration period as shown at step 495. This message from Device B may be encrypted using the third trial encryption key. When Device A receives this message, it decrypts it to obtain the values signifying to Device A to update its current derivation key, its current derivation index, and its current expiration period to those received in the message from Device B.

If there is no successful verification of the message by Device B using the third trial encryption key, Device B may disregard the message as shown in step 485.

Figure 5:
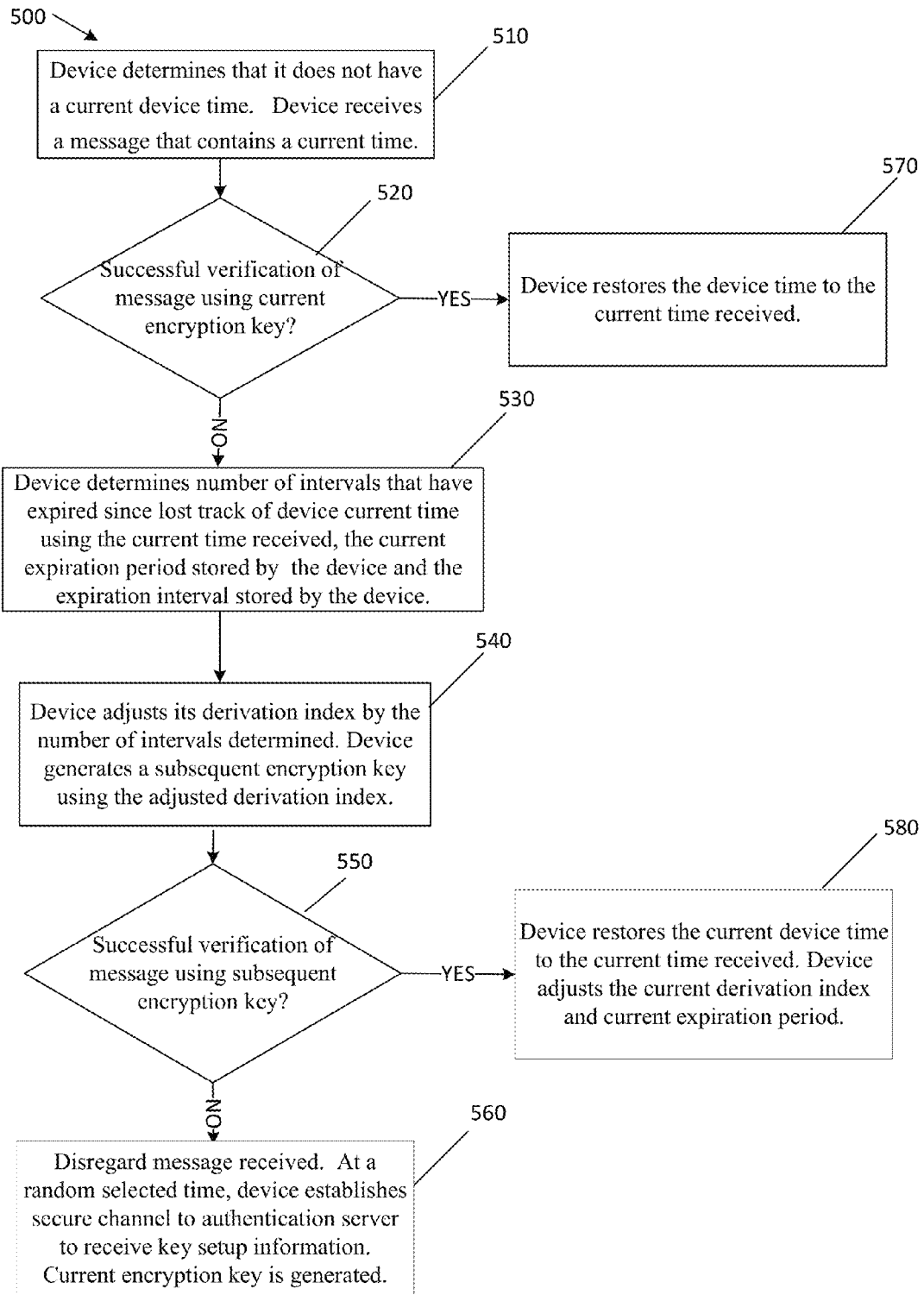
FIG. 5 is a flowchart illustrating a client device recovering the encryption key after a power outage.

FIG. 5 illustrates a process 500 for recovering the encryption key when the device has experienced a power outage or any other condition that would not have allowed the device to keep a current device time. In this example, at step 510 the device powers up after an outage and does not have a current device time. The device receives a message which includes a current time. This message may be received in a beacon message. A beacon message contains an authentication code that may be verified using the current encryption key.

At step 520, when a device that comes online receives a beacon message, it will attempt to verify the beacon message using its current encryption key. If verification succeeds, at step 570 the device can accept the time designated in the beacon message as the device's current time. Also, since verification was successful, the device has the current derivation key, current derivation index, current expiration period and current encryption key.

If verification of the beacon message fails, at step 530, the device calculates the number of expiration intervals that have expired since it lost power. This may be calculated using the time received in the beacon message, the current expiration period and the expiration interval. If the beacon message does not contain the time, the device may use one as the number of expiration intervals that have expired since it lost power.

At step 540, the device adjusts its current derivation index by the number of expiration intervals that have expired since it lost power. The current derivation index may be adjusted by incrementing it by the number of intervals that have expired since the device lost power. The device then generates a subsequent encryption key using the current derivation key and the current derivation index that was just adjusted. If verification of the beacon message succeeds using the subsequent encryption key generated, the device may accept the time in the beacon message as its current device time at step 580. Additionally, the device may generate a current expiration period based on the current expiration period and the expiration interval. The device updates its current values for the current derivation index and current encryption key to those just generated.

If verification of the beacon message fails with the subsequent current encryption key just generated, the beacon message is disregarded. In this example, at step 560, since the device received a beacon message it knows that there is a neighboring device. If after a predetermined time (i.e., 30 sec.) it is not able to obtain a valid time, it generates a time that is random over the next 24 hours. At that generated time it initiates authentication with the authentication server to receive key setup information to generate a current encryption key. The time to initiate authentication with the authentication server should be random so that all devices do not attempt authentication at the same time.

General Considerations

These examples given are only for illustrative purposes and not meant to limit the invention to these devices. While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art. In particular, the steps performed to generate a derivation index or an expiration period or an encryption key do not necessarily have to be performed in the order specified. For example, the expiration period may be generated or updated before or after the derivation index is generated. Also, the derivation index may be generated or updated upon expiration of the expiration period or may be generated or updated any time after the encryption key is generated. The derivation index adjustment is not limited to incrementing or decrementing, but may adjust the derivation index in other ways.

The invention claimed is:

1. A method for generating encryption keys by a client device, wherein the client device is one of a plurality of client devices in a network and each client device is provided with key generation information comprising computer-executable instructions for a derivation method and a derivation index adjustment, comprising:

establishing a secure channel between an authentication server and the client device;

receiving from the authentication server via the secure channel key setup information comprising a derivation key, a derivation index, an initial expiration period, and an expiration interval;

in response to the client device receiving the key setup information, generating an initial encryption key using the derivation method, the derivation key, and the derivation index, wherein the client device uses the initial encryption key to encrypt a first message to at least one of the plurality of client devices across the network and to decrypt a second message from one of the plurality of client devices across the network prior to expiration of the initial expiration period;

in response to the client device determining that the initial expiration period has expired:

generating a current derivation index by adjusting the derivation index previously received from the authentication server by the derivation index adjustment;

generating a current expiration period based on the initial expiration period and the expiration interval previously received from the authentication server; and generating a subsequent encryption key using the derivation method, the derivation key previously received from the authentication server, and the current derivation index, wherein the subsequent encryption key is valid until the current expiration period expires; and in response to the client device determining that the current expiration period has expired:
adjusting the current derivation index by the derivation index adjustment;
updating the current expiration period by the expiration interval previously received from the authentication server; and
generating a next subsequent encryption key using the derivation method, the derivation key previously received from the authentication server, and the current derivation index, wherein the next subsequent encryption key is valid until the current expiration period expires.

2. The method of claim 1, wherein the client devices are utility meters.

3. The method of claim 1, wherein the derivation method and the derivation index adjustment are provided to each of the client devices during installation or manufacture.

4. The method of claim 1 wherein the derivation method is based on a pseudo random function.

5. The method of claim 1 wherein the initial encryption key and the subsequent encryption key are truncated by the client device to a predetermined length when they exceed the predetermined length.

6. The method of claim 4 wherein the key setup information further comprises a number of iterations, and wherein generating the initial encryption key or the subsequent encryption key comprises iterating the pseudo random function the number of iterations.

7. The method of claim 6 wherein the pseudo random function is the SHA-256 based HMAC.

8. The method of claim 1, wherein the derivation index is an integer number and the client device converts the integer number into a binary string before using it with the derivation method.

9. The method of claim 1, wherein generating the initial encryption key further comprises using a label with the derivation method.

10. A method for recovering a current encryption key by a first client device from a second client device, the first client device storing a first current encryption key, a first key information comprising a first current derivation index, a first derivation key, a first derivation method, a first derivation index adjustment, a first current expiration period, and an expiration interval, the second client device storing a second current encryption key, comprising:
receiving an encrypted message by the first client device, the encrypted message sent by the second client device, wherein the message is encrypted using the second current encryption key;
in response to determining by the first client device that the first current encryption key fails to verify the message received from the second client device, generating a trial encryption key using the first derivation method, the first derivation key, and the first current derivation index incremented by the first derivation index adjustment;
in response to determining by the first client device that the trial encryption key successfully verifies the message received from the second client device, replacing the first current encryption key with the trial encryption key, adjusting the first current derivation index by incrementing it by the first derivation index adjustment, and adjusting the first current expiration period by the expiration interval;
in response to determining by the first client device that the trial encryption key fails to verify the message received from the second client device, generating a second trial encryption key using the first derivation method, the first derivation key, and the first current derivation index decremented by the first derivation index adjustment; and
in response to determining by the first client device that the second trial encryption key successfully verifies the message received from the second client device, the first client device sends a message to the second client device encrypted using the first current encryption key.

11. The method as in claim 10, further comprising:
in response to determining by the first client device that the second trial encryption key fails to verify the message received from the second client device, generating a third trial encryption key using the first derivation method, a previous first derivation key, and the first current derivation index; and
in response to determining by the first client device that the third trial encryption key successfully verifies the message received from the second client device, the first client device sends a message to the second client device encrypted using the third trial encryption key wherein the message comprises the first derivation key, the first current derivation index, and the first current expiration period.

12. A method for recovering a current encryption key by a client device that has experienced a power outage and does not have a current device time, comprising:
storing (i) key generation information comprising computer-executable instructions for a derivation method and a derivation index adjustment, and (ii) key setup information comprising a derivation key, a current derivation index, a current expiration period and an expiration interval;
receiving an encrypted message comprising a current time;
in response to determining that the encrypted message fails to be verified using the current encryption key:
determining a number of intervals expired since the power outage using the current time received, the current expiration period, and the expiration interval;
adjusting the current derivation index by the number of intervals expired since the power outage;
generating a subsequent encryption key using the derivation method, the derivation key and the current derivation index;
in response to determining that the encrypted message can be verified using the subsequent encryption key, setting the current device time to the current time received, updating the current encryption key to the subsequent encryption key, and adjusting the current expiration period based on the number of intervals expired; and
in response to determining that the encrypted message fails to be verified using the subsequent encryption key:
establishing a secure channel between the client device and an authentication server at a random time;
receiving from the authentication server via the secure channel key setup information; and
generating the current encryption key using the key setup information received from the authentication server.

13. A client device comprising:
a processor unit that includes a processor and processor unit memory, wherein the processor unit memory includes computer-executable instructions for initialization of the client device and key generation information comprising a derivation method and a derivation index adjustment; and
wherein the processor is operable to execute computer-executable instructions from the processor unit memory to:

receive a communication through a secure channel on a network, the communication containing key setup information from an authentication server, the key setup information comprising a derivation key, a derivation index, an initial expiration period, and an expiration interval;

in response to receiving key setup information generate an initial encryption key using the derivation method, the derivation key, and the derivation index, wherein the initial encryption key used to encrypt a first message to at least one of a plurality of client devices across the network and to decrypt a second message from one of the plurality of client devices across the network prior to expiration of the initial expiration period;

in response to determining that the initial expiration period has expired:

generate a current derivation index by adjusting the derivation index previously received from the authentication server by the derivation index adjustment;

generate a current expiration period based on the initial expiration period and the expiration interval previously received from the authentication server; and generate a subsequent encryption key using the derivation method, the derivation key previously received from the authentication server, and the current derivation index, wherein the subsequent encryption key valid until the current expiration period expires; and in response to determining that the current expiration period has expired:

adjust the current derivation index by the derivation index adjustment;

update the current expiration period by the expiration interval previously received from the authentication server; and generate a next subsequent encryption key using the derivation method, the derivation key previously received from the authentication server, and the current derivation index, wherein the next subsequent encryption key valid until the current expiration period expires.

14. The client device of claim 13 wherein the derivation index adjustment is one and the current derivation index is based on incrementing the current derivation index by the derivation index adjustment.

15. The client device of claim 13 wherein the key generation information is provided either at initialization or manufacture of the client device.

\* \* \* \* \*